Dec. 12, 1967  C. E. CHRISTIE  3,357,206
POWER TAKE-OFF SHAFT COUPLING
Filed Sept. 30, 1965
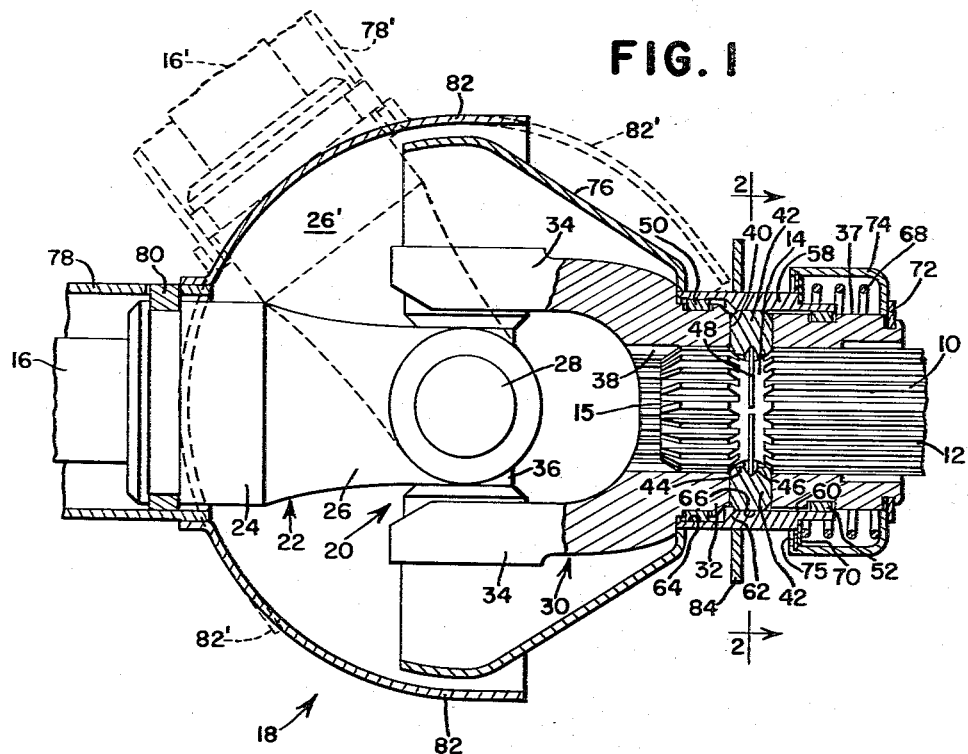
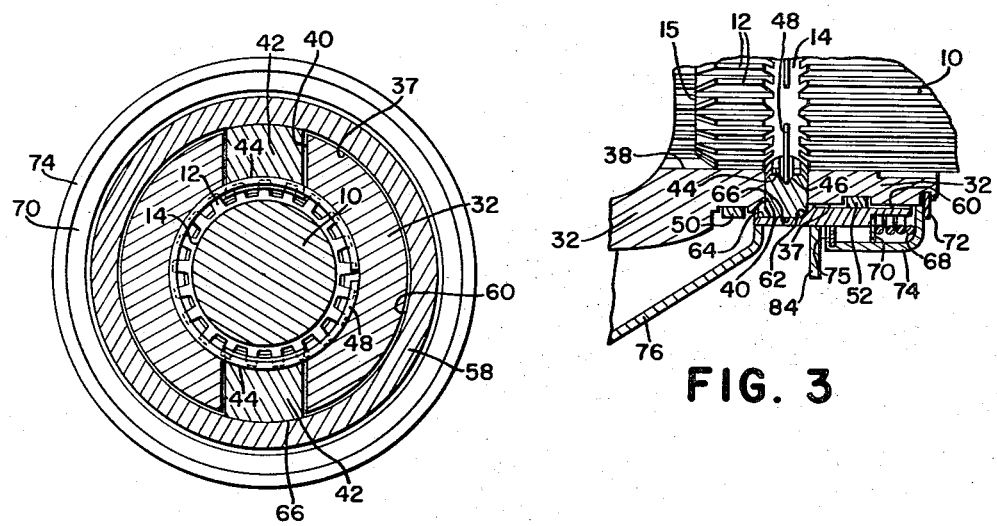
INVENTOR.
C. E. CHRISTIE United States Patent Office 3,357,206
Patented Dec. 12, 1967

3,357,206
POWER TAKE-OFF SHAFT COUPLING
Craig E. Christie, Cedar Falls, Iowa, assignor to Deere & Company, Moline, Ill., a corporation of Delaware
Filed Sept. 30, 1965, Ser. No. 491,616
3 Claims. (Cl. 64—6)

ABSTRACT OF THE DISCLOSURE

A coupling mechanism for connecting an externally splined power take-off shaft stub to a corresponding internally splined shaft having a universal joint adjacent the connection with rotatable overlapping shields enclosing the universal joint, the coupling mechanism including a lockable detent for axially locking the shafts.

---

This invention relates to a mechanism for coupling a tractor power take-off shaft to the drive shaft of an agricultural implement or the like, and more particularly to such a coupling mechanism having a novel locking mechanism and safety shielding.

Agricultural tractors are conventionally equipped with a splined, rearwardly projecting power take-off shaft to which the propeller shaft of a towed or mounted agricultural implement is connected by means of a coupling mechanism, which conventionally includes an internally splined member mating with the splined power take-off shaft and having a universal joint. Such mechanisms also generally include a releasable lock for preventing the inadvertent axial separation of the mating splined members.

One type of lock features a plurality of locking elements radially movable in apertures through the internally splined member by means of an axially shiftable cam member to a locking position wherein the locking elements engage the shaft.

The primary object of the present invention is to provide an improved coupling mechanism of this type and more particularly to provide such a mechanism which includes novel means for preventing the inward escape of the locking elements and means for biasing the locking elements radially outward to prevent the locking elements from sticking in their locked position.

Another object of the invention is to provide a coupling mechanism which is simple to operate, requires no tools, and which further is of sturdy, simple, an economical construction.

Another feature of the invention resides in the provision of novel shielding for the universal joint and coupling. The power take-off shaft is conventionally covered by a thimble-type shield when the shaft is not in use and is also partially enclosed by a master shield which is mounted on the tractor and shields the forward part of the coupling mechanism. However, the use of three-point-hitch-mounted equipment requires the removal of the master shield, and experience has shown that once the master shield is removed, it is frequently not replaced. Thus, while most coupling mechanisms provide shielding for the rear part of the universal joint, the forward portion of the universal joint has been exposed when the power take-off shaft is in use and the master shield is removed.

Accordingly, another object of the present invention is to provide a completely shielded coupling mechanism and power take-off shaft.

Still another object is to provide such shielding which is non-rotating and effective in a wide range of angular relationships between the front and rear yokes of the universal joint.

These and other objects will become apparent from a consideration of the following detailed description and accompanying drawings wherein:

FIG. 1 is a central section of the power take-off shaft and the coupling mechanism in a locked position, one extreme angular position of the rear yoke relative to the front yoke of the universal joint being shown in dotted lines.

FIG. 2 is a section along the line 2—2 of FIG. 1.

FIG. 3 is a fragmentary section similar to FIG. 1 but with the coupling mechanism in an unlocked position.

The numeral 10 designates a typical fore and aft tractor power take-off shaft having a plurality of external axial splines 12 and a coaxial annular groove or recess 14 near its terminal end 15. A conventional implement drive shaft 16 is connectible to the power take-off shaft 10 by means of a coupling mechanism indicated generally by the numeral 18 and mounted on the forward end of the drive shaft 16. The coupling mechanism includes a universal joint 20, which includes a rear yoke 22 having an integral hub portion 24 coaxially affixed to the implement drive shaft 16 and a bifurcated leg portion 26 journaling a transverse pivot 28. The universal joint 20 also includes a forward yoke 30 having an integral hub portion 32 and a bifurcated leg portion 34 journaling a transverse pivot 36 transversely and pivotally connected to the pivot 28. The hub portion 32 has a cylindrical exterior surface 37 and an internally splined axial socket 38 matable with the externally splined power take-off shaft 10. When the socket 38 receives the shaft 10, the yoke 30 and the shaft 10 are keyed for rotation in unison.

The hub portion 32 has a pair of opposite, radial openings 40 between the socket 38 and the exterior surface 37. A pair of locking elements 42, having transversely concave inner faces 44 substantially conforming to the recess 14, are radially slidable in the openings 40 between an inner or locking position wherein they project into the socket 38 and an outer or unlocking position, wherein they partially extend beyond the exterior surface 37. When the shaft 10 is inserted into the socket 38 with the recess 14 radially alined with the locking elements 42, the inner faces 44 will seat in the recess 14 when the locking elements move to their locking position, thereby locking the shaft 10 and yoke 30 against relative axial movement.

The inner face 44 of each locking element 42 has a groove 46, the grooves 46 being circumferentially alined and retaining a split ring 48 having a normal inside diameter slightly greater than the outside diameter of the shaft 10. The split ring compresses to approximately the diameter of the recess 14 as the locking elements move to their locking position, biasing the locking elements 42 radially outward toward their unlocking position.

A pair of axially spaced bushings 50 and 52, preferably of nylon or the like, are coaxially mounted in annular grooves in the exterior of the hub portion 32, and a sleeve-like retaining member 58 is coaxially mounted on the bushings for both relative rotation and axial sliding movement. The retaining member 58 has a cylindrical inner surface 60 slightly larger than the exterior surface 37 of the hub portion 32 and tapers at 62 to a larger diameter 64, the inside surface of the retaining member 58 forming a cam surface which engages the exterior ends 66 of each locking element 42. The retaining member 58 is axially biased rearwardly toward the position shown in FIG. 1 by a coaxial helical compression spring 68 acting between a ring 70 on the retaining member 58 and a second ring 72 on the hub portion 32. The spring 68 is shielded by a sleeve-like housing 74 supported at one end on the hub portion 32 and retained by the ring 72 and supported at the other end by the ring 70 which is retained by a third ring 75, the retaining member 58 being slidable through the ring 75 to engage the ring 70.

In the position shown in FIG. 1, the outer ends 66 of the locking elements 42 seat against the interior surface 60 of the retaining member 58, and the locking elements are maintained in their locking position wherein they project into the groove 14. The retaining member 58 may be manually moved forwardly against the bias of the spring 68 to a second position, as shown in FIG. 3, wherein the locking elements 42 move radially outwardly to their unlocking position by the biasing effect of the split ring 48. When the retaining member 58 is released, it is moved rearwardly by the spring 68, the inclined surface 62 of the retaining member forcing the locking elements 42 inwardly to their locking position against the bias of the split ring 48. The split ring 48 also functions as a retainer for the locking elements 42, preventing the inward loss of the elements into the socket 38 when the shaft 10 is not in the socket.

A bell shaped shield member 76, open at both ends, is coaxially affixed at its smaller end to the rear end of the retaining member 58 and extends rearwardly around the yoke 30, the shield member 76, retaining member 58, and housing 74 substantially enclosing the entire forward yoke 30.

The drive shaft 16 is conventionally shielded by a tubular shield 78 coaxially supported at its forward end on a bearing 80, preferably a nylon bushing, rotatable on the hub portion 24 of the yoke 22. A rear bell shaped member 82, also open at both ends, is coaxially affixed at its smaller end to the tubular shield 78, and its forward or larger end substantially overlaps the shield member 76.

As the universal joint 20 swings about either pivot 28 or 36, the shield member 76 swings about the pivot axis within the shield member 82. One maximum angular position of the universal joint 20 is shown in dotted lines in FIG. 1, wherein the rear yoke 26 is rotated approximately 45° about the pivot 28, the changed positions of the respective components being indicated by the numerals 26', 16', 78' and 82'. The overlap of the shield members 76 and 82 provides total shielding of the universal joint 20 for the usual deflections of the universal joint.

In operation, to couple the implement drive shaft 16 to the power take-off shaft 10, the operator pushes forwardly on the retaining member 58 by means of handle means 84 and fits the socket 38 onto the shaft 10, the forward movement of the retaining member 58 permitting the axial movement of the locking elements 42 to their unlocking position as shown in FIG. 3. When the yoke 30 reaches the point where the locking elements 42 are radially alined with the recess 14, the retaining member 58 is released and the spring 68 moves the retaining member 58 rearwardly, the inclined surface 62 forcing the locking elements radially inward to their locking position in the recess 14 as shown in FIG. 1. The total shielding of the universal joint and power take-off shaft in the normal operating positions of the universal joint prevents the operator from becoming entangled in any rotating part of the coupling mechanism, each component of the shield being rotatable on the coupling mechanism so that the shield will not rotate when engaged by any foreign object.

Other features and advantages of the present invention will readily occur to those skilled in the art, as will many modifications and alterations in the preferred embodiment of the invention described herein, all of which may be achieved without departing from the spirit and the scope of the invention.

What is claimed is:

1. A mechanism for coupling an implement drive shaft to an externally splined tractor power take-off shaft, having an annular recess near its terminal end, comprising: a universal joint having a first yoke connected to the implement drive shaft and a second yoke including a hub portion having an axial splined socket adaptable to receive the splined power take-off shaft and at least one radial opening between said socket and the hub exterior; a locking element radially movable in each opening between a locking position, wherein it is engageable with the said splined shaft recess to prevent relative axial movement between the yoke and splined shaft, and an unlocking position, wherein it disengages said recess permitting said relative axial movement; a retaining member slidable on the periphery of said hub between a first position, wherein it moves each locking element to its locking position, and a second position, wherein it permits radial movement of each locking element to its unlocking position; a split ring substantially coaxial with said socket and operably connected to each locking element for radial compression as each locking element moves to its locking position, biasing each element toward its unlocking position; and a second spring means operably extending between said second yoke and the retaining member for biasing the retaining member toward its first position.

2. The invention defined in claim 1 wherein each locking element has an inner face with a circumferential groove, the groove of each element being circumferentially alined with the groove of the other locking elements, the split ring being mounted in said grooves and having a larger inside diameter than the outside diameter of the power take-off shaft in the unlocked position of the locking elements.

3. The invention defined in claim 1 wherein the retaining member has a sleeve-like shape and is coaxially rotatable and axially slidable on the hub portion of the second yoke, and includes a cam surface on its inner periphery which engages and radially moves each locking element in response to axial movement of the retaining member.

References Cited

UNITED STATES PATENTS

| 2,959,943 | 11/1960 | Allen | 64—9 |
| 2,974,965 | 3/1961 | Welles | 287—119 |
| 3,053,062 | 9/1962 | Geisthoff | 64—4 |
| 3,260,541 | 7/1966 | Sadler et al. | 74—11 |

HALL C. COE, *Primary Examiner.*

MILTON KAUFMAN, FRED C. MATTERN,
*Examiners.*